United States Patent
Harashina et al.

(10) Patent No.: US 11,142,637 B2
(45) Date of Patent: Oct. 12, 2021

(54) POLYACETAL RESIN COMPOSITION

(71) Applicant: Polyplastics Co., Ltd., Tokyo (JP)

(72) Inventors: Hatsuhiko Harashina, Shizuoka (JP); Hirokazu Katsuchi, Shizuoka (JP)

(73) Assignee: Polyplastics Co., Ltd., Tokyo (JP)

( * ) Notice: Subject to any disclaimer, the term of this patent is extended or adjusted under 35 U.S.C. 154(b) by 239 days.

(21) Appl. No.: 16/082,052

(22) PCT Filed: Feb. 6, 2017

(86) PCT No.: PCT/JP2017/004190
§ 371 (c)(1),
(2) Date: Sep. 4, 2018

(87) PCT Pub. No.: WO2017/169120
PCT Pub. Date: Oct. 5, 2017

(65) Prior Publication Data
US 2020/0291223 A1    Sep. 17, 2020

(30) Foreign Application Priority Data

Mar. 31, 2016 (JP) .............................. JP2016-072361

(51) Int. Cl.
*C08L 59/04* (2006.01)
*C08K 9/06* (2006.01)
*C08K 3/38* (2006.01)
*C08L 9/06* (2006.01)

(52) U.S. Cl.
CPC ................ *C08L 59/04* (2013.01); *C08K 3/38* (2013.01); *C08K 9/06* (2013.01); *C08L 9/06* (2013.01)

(58) Field of Classification Search
CPC .. C08K 9/06; C08K 3/38; C08L 59/00; C08L 59/04
See application file for complete search history.

(56) References Cited

U.S. PATENT DOCUMENTS

| 5,777,019 A | 7/1998 | Anada |
| 7,619,020 B2* | 11/2009 | Shimoda ................. C08L 59/00 524/405 |
| 2005/0107513 A1 | 5/2005 | Papke |
| 2008/0039567 A1 | 2/2008 | Shimoda et al. |

FOREIGN PATENT DOCUMENTS

| CN | 102131865 A | 7/2011 |
| JP | S57-209856 A | 12/1982 |
| JP | H03-079631 A | 4/1991 |
| JP | H06-027204 B2 | 4/1991 |
| JP | H09-151298 A | 6/1997 |
| JP | 2000-335942 A | 12/2000 |
| JP | 2006-070196 A | 3/2006 |
| JP | 2008-044995 A | 2/2008 |
| JP | 2009-007522 A | 1/2009 |
| WO | WO 2003/074610 A1 | 3/2003 |
| WO | WO 2010/035351 A1 | 4/2010 |

OTHER PUBLICATIONS

Machine translation of JP 03-079631 A, published Apr. 4, 1991.*
Office Action issued in Indian Patent Application No. 201837034029, dated Aug. 5, 2020.

* cited by examiner

*Primary Examiner* — Vickey Nerangis
(74) *Attorney, Agent, or Firm* — Knobbe Martens Olson & Bear LLP

(57) ABSTRACT

A polyacetal resin composition which exhibits resistance to hot water, and contains 100 parts by mass of a polyacetal resin, 1 to 100 parts by mass, inclusive, of glass fibers subjected to a surface treatment with a blocked isocyanate compound and an aminosilane coupling agent, and 0.001 to 1.0 parts by mass, inclusive, of boric acid.

7 Claims, No Drawings

POLYACETAL RESIN COMPOSITION

RELATED APPLICATIONS

This application is the U.S. National Phase under 35 U.S.C. § 371 of International Application PCT/JP2017/004190, filed Feb. 6, 2017, designating the U.S., and published in Japanese as WO 2017/169120 on Oct. 5, 2017, which claims priority to Japanese Patent Application No. 2016-072361, filed Mar. 31, 2016, the entire contents of which are incorporated herein by reference.

TECHNICAL FIELD

The present invention relates to a polyacetal resin composition.

BACKGROUND ART

Polyacetal resins are superior in mechanical properties, thermal properties, electrical properties, sliding properties, moldability, impact resistance, dimensional stability of molded articles, and the like, and widely used for structural and mechanism parts of electrical devices, automotive components, precision machinery components, and the like. Polyacetal resins are known to be improved in terms of their mechanical properties, for example, strength and stiffness by blending reinforcing materials such as glass-based inorganic fillers.

Nonetheless, due to poor activities of both polyacetal resins and glass-based inorganic fillers, simple blending and melt-kneading of a polyacetal resin with a glass-based inorganic filler often results in insufficient mutual adhesiveness, failing to provide expected improvement of mechanical properties. Accordingly, various methods have been proposed for improving the adhesiveness between a polyacetal resin and a glass-based inorganic filler to enhance mechanical properties.

For example, the followings are known: adding a glass-based inorganic filler and a boric acid compound to a polyacetal resin, and surface-treating the glass-based inorganic filler with a specific silane compound (see Patent Document 1); and adding a glass fiber surface-treated with a polyurethane-based resin to a polyacetal resin, and further adjusting pH with phosphorous acid (see Patent Document 2); and the like.
Patent Document 1: Japanese Unexamined Patent Application, Publication No. H09-151298
Patent Document 2: Japanese Unexamined Patent Application, Publication No. 2000-335942

DISCLOSURE OF THE INVENTION

Problems to be Solved by the Invention

These approaches all rely on enhancing the chemical activities of a glass-based inorganic filler to obtain desired mechanical properties such as tensile strength, tensile elongation, and flexural strength. In recent years, however, provision of a polyacetal resin has been demanded which can show impact resistance, durability, and especially hot-water resistance in addition to those mechanical properties. In view of the above circumstances, further improvements in conventional polyacetal resins have been required in terms of enhancement of impact resistance and durability.

The present invention is made in view of the above circumstances. An object of the present invention is to provide a polyacetal resin having excellent mechanical properties such as tensile strength, tensile elongation, flexural strength, and impact resistance as well as having excellent hot-water resistance.

Means for Solving the Problems

After conducting extensive studies to achieve the aforementioned object, the present investors found that inclusion of a specific glass fiber and a small amount of boric acid in a polyacetal resin can improve hot-water resistance while maintaining high mechanical properties. Then the present invention has been completed. Specifically, the present invention can provide the followings.

(1) An embodiment of the present invention is a polyacetal resin composition including: 100 parts by mass of a polyacetal resin (A); 1 part by mass or more and 100 parts by mass or less of a glass fiber surface-treated with a blocked isocyanate compound and an aminosilane coupling agent; and 0.001 parts by mass or more and 1.0 part by mass or less of boric acid (C).

(2) Another embodiment of the present invention is the polyacetal resin composition according to (1), in which the glass fiber (B) is a glass fiber surface-treated with a blocked isocyanate compound, an aminosilane coupling agent, and a polyurethane resin.

(3) Still another embodiment of the present invention is the polyacetal resin composition according to (1) or (2), in which the boric acid (C) is orthoboric acid.

(4) Yet another embodiment of the present invention is the polyacetal resin composition according to any one of (1) to (3), further including 0.002 parts by mass or more and 10 parts by mass or less of a triazine derivative (D) having a nitrogen-containing functional group.

Effects of the Invention

The present invention can provide a polyacetal resin having excellent mechanical properties such as tensile strength, tensile elongation, flexural strength, and impact resistance as well as having excellent hot-water resistance.

PREFERRED MODE FOR CARRYING OUT THE INVENTION

Below, the specific embodiments of the present invention will be described in more detail. The present invention however shall not be limited in any way to the following embodiments, and modifications may appropriately be made without departing from the scope of the present invention.
<Polyacetal Resin Composition>

The polyacetal resin composition according to the present embodiment includes 100 parts by mass of a polyacetal resin (A); 1 part by mass or more and 100 parts by mass or less of a glass fiber surface-treated with a blocked isocyanate compound and an aminosilane coupling agent; and 0.001 parts by mass or more and 1.0 part by mass or less of boric acid (C). Below, each component will be described.
[Polyacetal Resin (A)]

The polyacetal resin (A) is a polymer compound having an oxymethylene group ($-CH_2O-$) as the main constituent unit, and may be either of a polyoxymethylene homopolymer; or a copolymer, a terpolymer, or a block polymer having an oxymethylene group as the main repeating unit and including a small amount of an additional constituent unit other than the oxymethylene group, for example, a comonomer unit such as ethylene oxide, 1,3-dioxolane, and 1,4-butanediol formal. Further, the polyacetal resin may have a linear, or even branched or cross-linked molecular structure, and may be a known modified polyoxymethylene into which another organic group is introduced. Moreover, there is no particular limitation for the degree of polymerization of the polyacetal resin, as long as the polyacetal resin has melt-moldability (for example, the melt flow rate (MFR) thereof may be 1.0 g/10 minutes or more and 100 g/10 minutes or less at 190° C. under a load of 2160 g).

[Glass Fiber Surface-Treated with Blocked Isocyanate Compound and Aminosilane Coupling Agent (B)]

The glass fiber (B) needs to be surface-treated with a blocked isocyanate compound and an aminosilane coupling agent. The glass fiber needs to be surface-treated with a blocked isocyanate compound and an aminosilane coupling agent, but there is no particular limitation for the order of timing the surface treatment. That is, the glass fiber may be surface-treated first with a blocked isocyanate compound and then with an aminosilane coupling agent, or may be surface-treated first with an aminosilane coupling agent and then with a blocked isocyanate compound. Further, the glass fiber (B) may be simultaneously surface-treated with a blocked isocyanate compound and an aminosilane coupling agent.

Whether a glass fiber is surface-treated or not with a blocked isocyanate compound and an aminosilane coupling agent can be determined by extracting the glass fiber from a polyacetal resin composition by solvent extraction, and then analyzing components thereof.

A glass fiber which is surface-treated, but not with a blocked isocyanate compound and an aminosilane coupling agent may even be used as a constitutional component of a polyacetal resin composition. However, this is not preferred because the resulting polyacetal resin composition may be inferior in terms of not only mechanical properties such as tensile strength but also hot-water resistance as compared with a polyacetal resin composition including a glass fiber surface-treated with a blocked isocyanate compound and an aminosilane coupling agent.

There is no particular limitation for an isocyanate compound to be used as a raw material of the blocked isocyanate compound as long as it is a polyfunctional isocyanate compound having two or more isocyanate groups in one molecule. Examples of the isocyanate compound may include, for example, aliphatic, cycloaliphatic (hereafter may also be referred to "alicyclic"), and aromatic isocyanate compounds. Among these, aliphatic and alicyclic isocyanate compounds are particularly preferred in view of compatibility and suitability with polyacetal resins. Particularly preferred are bifunctional aliphatic or alicyclic diisocyanates, and polyisocyanates in which these diisocyanates are multimerized.

As aliphatic diisocyanates, those having a carbon number of 4 or more and 30 or less are preferred, and those having a carbon number of 5 or more and 10 or less are more preferred. Specific examples can include tetramethylene-1,4-diisocyanate, pentamethylene-1,5-diisocyanate, hexamethylene diisocyanate, 2,2,4-trimethyl-hexamethylene-1,6-diisocyanate, lysine diisocyanate, and the like. Further, alicyclic diisocyanates preferably have a carbon number of 8 or more and 15 or less, preferably a carbon number of 10 or more and 18 or less. Specific examples can include isophorone diisocyanate, 1,3-bis(isocyanatemethyl)-cyclohexane, 4,4'-dicyclohexylmethane diisocyanate, and the like. Further, aromatic diisocyanates include xylene diisocyanate, tolylene diisocyanate, diphenylmethane diisocyanate, and the like.

Moreover, polyisocyanates include prepolymers having isocyanate groups, such as those obtainable from the addition reaction of compounds having at least two isocyanate groups per molecule, for example, various aromatic diisocyanates such as tolylene diisocyanate or diphenylmethane diisocyanate, various aralkyl diisocyanates such as meta-xylylene diisocyanate, α,α,α',α'-tetramethyl-meta-xylylene diisocyanate and aliphatic or alicyclic diisocyanates such as hexamethylene diisocyanate, dicyclohexylmethane diisocyanate, or isophorone diisocyanate, and polyhydric alcohols; prepolymers having isocyanurate rings, such as those obtainable from ring-forming trimerization of the aforementioned various diisocyanates; polyisocyanates having biuret structures, such as those obtainable from reactions of the aforementioned various diisocyanates with water; and the like.

Among these, hexamethylene diisocyanate, or cyclic trimers of hexamethylene diisocyanate are preferred in view of the impact resistance and durability of the resulting composition and industrial availability. It is noted that the above compounds may also be used in combination of two or more.

There is no particular limitation for the blocked isocyanate compound for use in the present embodiment, but those may be used in which the reactive groups of the above isocyanate compounds are blocked with well-known blocking agents by conventional methods. Specific examples of the blocking agents include, but not limited to: for example, oxime-based blocking agents such as methyl ethyl ketoxime, acetoxime, cyclohexanone oxime, acetophenone oxime, and benzophenone oxime; phenol-based blocking agents such as m-cresol and xylenol; alcohol-based blocking agents such as methanol, ethanol, butanol, 2-ethylhexanol, cyclohexanol, and ethylene glycol monoethyl ether; lactam-based blocking agents such as ε-caprolactam; diketone-based blocking agents such as diethyl malonate and acetoacetic ester; mercaptan-based blocking agents such as thiophenol; urea-based blocking agents such as thiourea; imidazole-based blocking agents; carbamic acid-based blocking agents; bisulfites; and the like. Among these, lactam-based blocking agents, oxime-based blocking agents, and diketone-based blocking agents are preferably used.

An aminosilane coupling agent is further used for the surface treatment of a glass fiber according to the present embodiment. The term "aminosilane coupling agent" means a compound including a silicon atom attached to an alkoxy group; and a functional group including a nitrogen atom in one molecule.

Specific examples of the aminosilane coupling agent include, γ-aminopropyltrimethoxysilane, γ-aminopropylmethyldimethoxysilane, γ-aminopropyltriethoxysilane, N-(2-aminoethyl)-3-aminopropyltrimethoxysilane, N-(2-aminoethyl)-3-aminopropyltriethoxysilane, N,N'-bis-[3-(trimethoxysilyl)propyl]ethylenediamine, N,N'-bis-[3-(triethoxysilyl)propyl]ethylenediamine, N,N'-bis-[3-(methyldimethoxysilyl)propyl]ethylenediamine, N,N'-bis-[3-(trimethoxysilyl)propyl]hexamethylenediamine, N,N'-bis-[3-(triethoxysilyl)propyl]hexamethylenediamine, and the like. Further, these aminosilane coupling agents may be used alone or in combination of two or more.

As the above aminosilane coupling agents, preferably mentioned are, in particular, γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-(≈-aminoethyl)-γ-aminopropyltriethoxysilane, and N-phenyl-γ-aminopropyltrimethoxysilane, γ-aminopropyltrimethoxysilane and γ-aminopropyltriethoxysilane are more preferably mentioned. These aminosilane coupling agents tend to provide a synergistic effect when used in combination with a blocked isocyanate compound, and can improve the adhesiveness between a polyacetal resin and a glass fiber.

The glass fiber for use in the present embodiment is preferably surface-treated with a blocked isocyanate compound, an aminosilane coupling agent, and a polyurethane resin. The glass fiber is sufficient surface-treated with a blocked isocyanate compound, an aminosilane coupling agent, and a polyurethane resin, but there is no particular limitation for the order of timing of the surface treatment. That is, the glass fiber may be surface-treated sequentially or simultaneously with two or more of the surface treatment agents.

In view of binding properties and the like, a polyurethane resin is particularly suitable which can be obtained from a polyisocyanate component mainly including a xylylene diisocyanate and a polyol component mainly including a polyester polyol. Here, xylylene diisocyanates include o-xylylene diisocyanate, m-xylylene diisocyanate, p-xylylene diisocyanate, and mixtures thereof. Among these, m-xylylene diisocyanate is preferred.

Meanwhile, polyester polyols include, for example, condensation-based polyester polyols which can be obtained by dehydration condensation of a polyhydric alcohol and a polyvalent carboxylic acid, lactone-based polyester polyols which can be obtained by ring-opening polymerization of lactone on the backbone of a polyhydric alcohol, ester-modified polyols which are ester-modified with lactone at the ends of polyether polyols, copolymerized polyester polyols thereof, and the like.

Polyhydric alcohols for use in the above condensation-based polyester polyols include, for example, ethylene glycol, propylene glycol, 1,3-propanediol, butylene glycol, 1,4-butanediol, 1,5-pentanediol, hexylene glycol, glycerin, trimethylolpropane, trimethylolethane, pentaerythritol, diethylene glycol, triethylene glycol, tetraethylene glycol, polyethylene glycol, dipropylene glycol, and the like. Polyvalent carboxylic acids include, for example, succinic acid, adipic acid, azelaic acid, sebacic acid, dodecanedicarboxylic acid, maleic anhydride, fumaric acid, 1,3-cyclopentanedicarboxylic acid, 1,4-cyclohexanedicarboxylic acid, terephthalic acid, isophthalic acid, phthalic acid, 1,4-naphthalenedicarboxylic acid, biphenyldicarboxylic acid, trimellitic acid, and the like.

Further, the lactone-based polyester polyols include, for example, poly(ε-caprolactone) polyol and the like. These polyester polyols suitably have a weight average molecular weight in the range from 500 or more and to 4000 or less. It is noted that the weight average molecular weight of a resin as used herein is a value measured by the GPC method in terms of the standard polystyrene.

A polyurethane resin may be manufactured by, for example, heating a xylylene diisocyanate and a polyester polyol in the absence of a solvent or in the presence of a small amount of an organic solvent at around 30° C. or more and 130° C. or less. It is noted that this heating reaction may be appropriately performed in the presence of a polyhydric alcohol as a chain extender, which is exemplified above in the description of polyester polyols. Further, when an organic solvent is used, there is no particular limitation for the organic solvent as long as it does not react with isocyanate, and is miscible in water. For example, acetone, methyl ethyl ketone, tetrahydrofuran, dimethylformamide, and the like can be used.

When used for the surface treatment of a glass fiber, a blocked isocyanate compound, an aminosilane coupling agent, and, if desired, a polyurethane resin are preferably dissolved in an organic solvent(s) or dispersed in water as described below. Specifically, examples of methods of manufacturing an aqueous emulsion containing a polyurethane resin include a method using self-emulsification and a method using an emulsifying agent. They may be appropriately combined.

(1) A method including: introducing an ionic group (a sulfonic acid group, an amino group, a carboxyl group, and the like) or a nonionic hydrophilic group (polyethylene glycol, polyoxyalkylene glycol, and the like) into a side chain or an end of a polyurethane resin to hydrophilize the polyurethane resin, and then dispersing or dissolving the resulting polyurethane resin by self-emulsification.

(2) A method including: manufacturing a polyurethane resin in the presence of a water-soluble polyol, which serves as a monomer, such as polyethylene glycol or monoalkoxy-polyethylene glycol in addition to a polyester polyol component and a xylylene diisocyanate component to obtain a relatively hydrophilic polyurethane-based resin, and then dispersing or dissolving the relatively hydrophilic polyurethane-based resin in water by self-emulsification.

(3) A method including: forcing a polymer in which an isocyanate group present in a polyurethane resin is blocked with a blocking agent (alcohol, oxime, and the like) to disperse with the aid of an emulsifying agent and mechanical shear force.

(4) A method including: forcing a polyurethane resin to disperse into water with the aid of an emulsifying agent and mechanical shear force particularly without using a blocking agent.

Further, a chain extender may also be added to a polyurethane-based resin having an isocyanate group during or after emulsification to manufacture an emulsion of a polyurethane-based resin having an even higher molecular weight. As a chain extender to be used in that case, for example, known agents such as ethylene glycol, diethylene glycol, propylene glycol, hydrazine, and N,N-dimethylhydrazine may be used.

There is no particular limitation for the single-filament diameter of a glass fiber for use in the present embodiment, but it is preferably 8 μm or more and 14 μm or less. When the glass fiber has a single-filament diameter of less than 8 μm, the mechanical properties and hot-water residence of molded articles are not affected, but the productivity of the molded articles (raw-material feedability) tends to be deteriorated. On the other hand, when it has a single-filament diameter of more than 14 μm, the degree of improvement in strength is less than expected from the amount added. It is noted that the term "single-filament diameter" of a glass fiber as used herein refers to the average value of diameters of cross sections of 25 filaments as measured in accordance with JIS R 3420.

The blending amount of the glass fiber (B) is 1 part by mass or more and 100 parts by mass or less relative to 100 parts by mass of a polyacetal resin, preferably 5 parts by mass or more and 55 parts by mass or less, and in particular preferably 10 parts by mass or more and 40 parts by mass or less. A content of the glass fiber of less than 1 part by mass cannot improve the mechanical properties and hot-water resistance of the resulting formed article while a content of more than 100 parts by mass may result in poor moldability.

[Boric Acid (C)]

The polyacetal resin composition according to the present embodiment includes boric acid (C) in order to improve mechanical properties and hot-water resistance.

There is no particular limitation for the type of the boric acid (C), but it may be any of orthoboric acid, metaboric acid, or tetraboric acid. Among these, orthoboric acid is preferred. The blending amount of the boric acid (C) is 0.001 parts by mass or more and 1.0 part by mass or less, preferably 0.01 parts by mass or more and 0.5 parts by mass or less. A content of less than 0.001 parts by mass may result in inferior mechanical properties and hot-water resistance, and cannot provide desired effects while a content of more than 1.0 part by mass may also result in inferior mechanical properties and hot-water resistance, and cannot provide desired effects, either.

Even though a polyacetal resin composition contains an acid, the effects of the present invention cannot be obtained if the acid is a common inorganic or organic acid. That is, even if hydrochloric acid or phosphoric acid as an inorganic acid; formic acid or acetic acid as an organic acid; or the like is used, the mechanical properties and hot-water resistance will not reach the level of effects which can be obtained when boric acid is used.

The present embodiment is characterized in that the combination of the glass fiber (B) subjected to specific surface treatment and the boric acid (C) is used to improve both the mechanical properties and hot-water resistance of a polyacetal resin. The mechanism in which the combination of the glass fiber (B) subjected to specific surface treatment and the boric acid (C) can improve both the mechanical properties and hot-water resistance of a polyacetal resin is not clearly understood, but may be attributed to synergistic effects from the interaction with a specific compound used for the surface treatment. Therefore, the mechanical properties and hot-water resistance of a polyacetal resin cannot be sufficiently obtained in a case where the glass fiber is surface-treated without using a blocked isocyanate compound and an aminosilane coupling agent; or in a case where the polyacetal resin does not include the boric acid (C), or includes an acid other than the boric acid (C).

[Other Agents]

(Other Glass Fibers)

The polyacetal resin composition according to the present embodiment may further include a glass fiber surface-treated with a known coupling agent other than the aminosilane coupling agent. Coupling agents suitable for improving a glass fiber in terms of wettability, adhesiveness, and the like with a polyacetal resin include, for example, silane-based, titanate-based, aluminum-based, chromium-based, zirconium-based, borane-based coupling agents, and the like. Among these, silane-based coupling agents are particularly suitable.

Silane-based coupling agents include, for example, vinylalkoxysilane, epoxyalkoxysilane, mercaptoalkoxysilane, allylalkoxysilane, and the like. Examples of vinylalkoxysilane include vinyltriethoxysilane, vinyltrimetoxysilane, vinyltris(β-methoxyethoxy)silane, and the like. Examples of epoxyalkoxysilane include γ-glycidoxypropyltrimetoxysilane, β-(3,4-epoxycyclohexyl)ethyltrimethoxysilane, γ-glycidoxypropyltriethoxysilane, and the like. Examples of mercaptoalkoxysilane include γ-mercaptopropyltrimethoxysilane, γ-mercaptopropyltriethoxysilane, and the like. Examples of allylalkoxysilane include γ-diallylaminopropyltrimethoxysilane, γ-allylaminopropyltrimethoxysilane, γ-arylthiopropyltrimethoxysilane, and the like. Titanate-based surface treatment agents include, for example, titanium-i-propoxyoctylene glycolate, tetra-n-butoxy titanium, tetrakis(2-ethylhexyloxy)titanium, and the like. These coupling agents may be used alone or in combination of two or more.

(Various stabilizers and Additives)

Various known stabilizers/additives can be blended with the polyacetal resin composition according to the present embodiment. Stabilizers can include any one or two or more of hindered phenol-based compounds, nitrogen-containing basic compounds, hydroxides of alkali or alkaline earth metals, inorganic salts of alkali or alkaline earth metals, carboxylates of alkali or alkaline earth metals, and the like. Additives can include common additives for use in thermoplastic resins, for example, any one or two or more of coloring agents such as dyes and pigments, lubricants, nucleating agents, parting agents, antistatic agents, and surfactants.

Among these, a nitrogen-containing basic compound is used to improve the thermal stability of a polyacetal resin composition. There is no particular limitation for the type of the nitrogen-containing basic compound, but a triazine derivative (D) having a nitrogen-containing functional group can be mentioned as one example.

Specific examples of the triazine derivative (D) having a nitrogen-containing functional group include guanamine, melamine, N-butylmelamine, N-phenylmelamine, N,N-diphenylmelamine, N,N-diallylmelamine, N,N',N-triphenylmelamine, benzoguanamine, acetoguanamine, 2,4-diamino-6-butyl-sym-triazine, ammeline, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine, 2-oxy-4,6-diamino-sym-triazine, 1,1-bis-(3,5-diamino-2,4,6-triazinyl)methane, 1,2-bis-(3,5-diamino-2,4,6-triazinyl)ethane (may also be referred to as "succinoguanamine"), 1,3-bis-(3,5-diamino-2,4,6-triazinyl)propane, 1,4-bis-(3,5-diamino-2,4,6-triazinyl)butane, methylenized-melamine, ethylenedimelamine, triguanamine, melamine cyanurate, ethylenedimelamine cyanurate, triguanamine cyanurate, and the like.

These triazine derivatives may be used alone or in combination of two or more. Guanamine and melamine are preferably used. Among these, melamine is particularly preferred.

When the above triazine derivative (D) having a nitrogen-containing functional group is blended in the present embodiment, the blending amount thereof is preferably 0.001 parts by mass or more and 10 parts by mass or less relative to 100 parts by mass of a polyacetal resin, more preferably 0.01 parts by mass or more and 2 parts by mass or less, and in particular preferably 0.03 parts by mass or more and 1 part by mass or less. Advantageously, a content of the above triazine derivative (D) of 0.001 parts by mass or more can improve thermal stability of a polyacetal resin while a content of 10 parts by mass or less can avoid problems such as elution from a polyacetal resin.

Further, one or two or more of known inorganic, organic, metal, and other bulking filler in the fibrous, plate-like, powder and granular, and other forms other than the glass fiber may also be blended in combination of one or two or more within a rage where the performance of a molded article intended for the present embodiment is not significantly deteriorated. Examples of these bulking filler include, but not limited to, talc, mica, wollastonite, carbon fiber, glass beads, and the like.

The polyacetal resin composition according to the present embodiment can easily be prepared by a known method commonly used for preparing a conventional resin composition. For example, either of the following methods may be used: a method including mixing each component, and then performing kneading extrusion with a single or twin screw extruder to prepare pellets, which are then subjected to molding; a method including first preparing pellets (master batches) having different compositions, and mixing (diluting) with the predetermined amounts of the pellets before molding, and then performing molding to obtain a molded article having a desired composition; or the like. Further, in view of improving dispersibility of additives, a method for preparing an acetal composition is also preferred, the method including pulverizing some or all of a polyacetal resin as a base material, mixing the resulting material with other components, and then performing extrusion.

EXAMPLES

Below, the present invention will be described in more detail with reference to Examples, but the present invention shall not be limited in any sense to the following Examples.

<Preparation of Polyacetal Resin Composition>

TABLE 1

| | | | Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 |
| Composition | (A) POM resin | (A1) | 100 | 100 | 100 | 100 | 100 | 100 | 100 | | | | |
| | | (A2) | | | | | | | | 100 | 100 | 100 | 100 |
| | (B) Specific glass fibers | (B1) | 35 | 35 | | | | | | | | | 10 |
| | | (B2) | | | 35 | | | | | | | | |
| | | (B3) | | | | 35 | 35 | | 55 | 35 | 35 | 55 | |
| | | (B4) | | | | | | 35 | | | | | |
| | (B'1) Other glass fibers | (B'1) | | | | | | | | | | | |
| | (C) Boric acid | (C1) | 0.03 | 0.03 | 0.03 | 0.03 | 0.03 | 0.05 | 0.05 | 0.05 | 0.03 | 0.03 | 0.01 |
| | (C') Other acids | (C'1) | | | | | | | | | | | |
| | | (C'2) | | | | | | | | | | | |
| | (D) Triazine derivative | (D1) | | 0.1 | | | 0.1 | 0.2 | 0.1 | | 0.1 | 0.1 | |
| Evaluation | Physical properties | Tensile strength (KPa) | 126 | 148 | 137 | 130 | 155 | 153 | 182 | 132 | 157 | 178 | 108 |
| | | Tensile elongation (%) | 2.1 | 2.9 | 2.2 | 2.5 | 3 | 2.7 | 2.6 | 2.4 | 2.6 | 2.9 | 3.9 |
| | | Bending strength (MPa) | 183 | 200 | 192 | 192 | 212 | 208 | 250 | 188 | 212 | 232 | 115 |
| | | Bending elastic modulus (MPa) | 7700 | 7900 | 7800 | 7800 | 7900 | 7900 | 10500 | 7700 | 7800 | 9300 | 3670 |
| | | Charpy impact strength (kJ/m$^2$) | 6.5 | 8.2 | 6.6 | 6.9 | 8.7 | 8.5 | 9.1 | 6.8 | 8.7 | 8.9 | 3.9 |
| | After hot-water treatment at 120° C. for 4 days | Tensile strength (MPa) | 77.5 | 89.2 | 78.1 | 75.5 | 88.7 | 86.4 | 106 | 73 | 86.2 | 104 | 58.9 |
| | | Tensile strength retention percentage (%) | 61.5 | 60.3 | 57 | 58.1 | 57.2 | 56.5 | 58.4 | 55.3 | 54.9 | 58.4 | 60.1 |

(Units are in parts by mass.)

in Table 1 Flexural strength, Flexural Modulus

TABLE 2

| | | | Comparative Eample | | | | | | |
|---|---|---|---|---|---|---|---|---|---|
| | | | 1 | 2 | 3 | 4 | 5 | 6 | 7 |
| Composition | (A) POM resin | (A1) | 100 | 100 | 100 | 100 | 100 | 100 | |
| | | (A2) | | | | | | | 100 |
| | (B) Specific glass fibers | (B1) | 35 | | | | 35 | 35 | 10 |
| | | (B2) | | | | | | | |
| | | (B3) | | | 35 | 35 | | | |
| | | (B4) | | | | | | | |
| | (B) Other glass fibers | (B'1) | | | | | 35 | | |
| | (C) Boric acid | (C1) | | | | | | 0.03 | |

TABLE 2-continued

|  |  |  | Comparative Example | | | | | | |
|---|---|---|---|---|---|---|---|---|---|
|  |  |  | 1 | 2 | 3 | 4 | 5 | 6 | 7 |
|  | (C') Other acids | (C'1) |  |  |  |  | 0.01 |  |  |
|  |  | (C'2) |  |  |  |  |  | 0.03 |  |
|  |  | (D1) |  |  | 0.1 |  |  |  |  |
| Evaluation | Physical properties | Tensile strength (MPa) | 110 | 118 | 108 | 90 | 98 | 113 | 78 |
|  |  | Tensile elongation (%) | 1.8 | 1.9 | 1.7 | 1.9 | 1.5 | 1.8 | 2.8 |
|  |  | Bending strength (MPa) | 165 | 169 | 162 | 135 | 155 | 166 | 87 |
|  |  | Bending elastic modulus (MPa) | 7500 | 7500 | 7400 | 6100 | 7050 | 7450 | 3350 |
|  |  | Charpy impact strength (kJ/m$^2$) | 6 | 6.2 | 6 | 4.8 | 4.9 | 5.1 | 2.8 |
|  | After hot-water treatment at 120° C. for 4 days | Tensile strength (MPa) | 65.7 | 68.6 | 63 | 50.1 | 37.9 | 63.3 | 46.4 |
|  |  | Tensile strength retention percentage (%) | 59.7 | 58.1 | 58.3 | 55.7 | 38.7 | 55.1 | 59.5 |

(Units are in parts by mass.)

in Table 2 Flexural strength,
Flexural Modulus
Materials shown in Tables 1 and 2 are as follows.
[Polyacetal Resin (A)]
A polyacetal resin (A1) (a polyacetal copolymer (melt index (as measured at 190° C. under a load of 2160 g): 45 g/10 min) in which 96.7 mass % of trioxane and 3.3 mass % of 1,3-dioxolane are copolymerized)
A polyacetal resin (A2) (a polyacetal copolymer (melt index (as measured at 190° C. under a load of 2160 g): 9 g/10 min) in which 96.7 mass % of trioxane and 3.3 mass % of 1,3-dioxolane are copolymerized)
[Surface-Treated Glass Fiber (B)]
A 10-μm chopped strand (B1) surface-treated with 1.2 mass % of a blocked isocyanate, a hexamethylene diisocyanate blocked with methyl ethyl ketoxime and 0.02 mass % of an aminosilane coupling agent (γ-aminopropyltriethoxysilane). A 13-μm chopped strand (B2) surface-treated with 1.2 mass % of a blocked isocyanate, a hexamethylene diisocyanate cyclic trimer blocked with methyl ethyl ketoxime and 0.02 mass % of an aminosilane coupling agent (γ-aminopropyltriethoxysilane). A 10-μm chopped strand (B3) surface-treated with 1.0 mass % of the blocked isocyanate described in Example 1 of Japanese Examined Patent Application Publication No. H06-27204, 0.02 mass % of an aminosilane coupling agent, and 0.3 mass % of a polyurethane resin. A 10-μm chopped strand (B4) surface-treated with 1.0 mass % of a blocked isocyanate, a hexamethylene diisocyanate blocked with methyl ethyl ketoxime, 0.02 mass % of an aminosilane coupling agent (γ-aminopropyltriethoxysilane), and 0.3 mass % of a polyurethane resin.
[Other Glass Fibers (B')]
A glass fiber (B'1) surface-treated with a different surface treatment agent
A glass fiber surface-treated with polyvinyl acetate (single-filament diameter: 10 μm)
[Boric acid (C)]
Orthoboric acid (C1)
[Other acids (C')]
Phosphoric acid (C'1)
Acetic acid (C'2)
[Triazine Derivative (D) Having Nitrogen-Containing Functional Group]
Melamine (D1)

A glass fiber, an acid, and a triazine derivative having a nitrogen-containing functional group in the amounts shown in Tables 1 and 2 were blended with 100 parts by mass of a polyacetal resin, and melt kneading was performed with an extruder with a cylinder temperature of 200° C. to prepare pellet-shaped polyacetal resin compositions according to Examples and Comparative Examples.
<Evaluation of Physical Properties>
Test pieces were molded with an injection molding machine for the pellet-shaped compositions according to Examples and Comparative Examples. Tensile strength/tensile elongation in accordance with ISO527-1, 2, flexural strength/flexural modulus in accordance with ISO178, and Charpy impact strength (notched, at 23° C.) in accordance with ISO179.1eA were determined. Results are shown in Tables 1 and 2.
<Evaluation of Hot-Water Resistance>
A tensile test piece in accordance with ISO3167 was immersed in 120° C. hot water in an autoclave for 4 days, and then got out of hot water and made the tensile strength measurements under the aforementioned tensile strength/elongation evaluation conditions. Tensile strength retention percentages were calculated when a value of tensile strength before immersion was considered as 100%. Results are shown in Tables 1 and 2.
The results from Table 1 indicate that molded articles of the polyacetal resin compositions including 100 parts by mass of the polyacetal resin (A); 1 part by mass or more and 100 parts by mass or less of the glass fiber (B) surface-treated with a blocked isocyanate compound and an aminosilane coupling agent; and 0.001 parts by mass or more and 1.0 part by mass or less of the boric acid (C) all have superior mechanical properties of tensile strength, tensile elongation, and impact strength as well as superior hot-water resistance (Examples 1 to 11).

The results also indicate that the molded article of the polyacetal resin composition from Example 4 which includes the glass fiber (B3) surface-treated with a polyurethane resin in addition to a blocked isocyanate compound and an aminosilane coupling agent shows higher impact strength than the molded article of the polyacetal resin composition from Example 1 in which no polyurethane resin is used for the surface treatment. Further, the results indicate that the molded article of the polyacetal resin composition from Example 5 which includes the combination of the glass fiber (B3) and a triazine derivative shows even higher impact strength than the molded article of the polyacetal resin composition from Example 4, demonstrating that the triazine derivative can enhance the effects from the glass fiber surface-treated according to an embodiment of the present invention.

In contrast, as clearly shown in Table 2, Comparative Examples 1 to 7, including no boric acid, using other acids, and using other surface treatment agents are generally inferior to Examples according to the present invention in mechanical properties such as initial tensile strength and impact resistance. In particular, Comparative Example 4 including a glass fiber surface-treated with treatment agents which are not specified for use in an embodiment of the present invention and Comparative Examples 5 and 6 including the glass fiber specified for use in an embodiment of the present invention, but including acids which are not boric acid have significantly inferior mechanical properties as compared with Examples of the present invention. These results clearly demonstrate that the combination of the polyacetal resin (A), the glass fiber (B) surface-treated with a block isocyanate compound and an aminosilane coupling agent, and the boric acid (C) can synergistically improve the mechanical properties of a polyacetal resin composition.

The invention claimed is:

1. A polyacetal resin composition, comprising:
   100 parts by mass of a polyacetal resin (A);
   10 parts by mass or more and 55 parts by mass or less of a glass fiber (B) surface-treated with a blocked polyfunctional isocyanate compound and an aminoalkoxysilane coupling agent; and
   0.001 parts by mass or more and 1.0 part by mass or less of boric acid (C).

2. The polyacetal resin composition according to claim 1, wherein the glass fiber (B) is a glass fiber surface-treated with a blocked polyfunctional isocyanate compound, an aminoalkoxysilane coupling agent, and a polyurethane resin.

3. The polyacetal resin composition according to claim 1, wherein the boric acid (C) is orthoboric acid.

4. The polyacetal resin composition according to claim 1, further comprising 0.002 parts by mass or more and 10 parts by mass or less of a triazine derivative having a nitrogen-containing functional group.

5. The polyacetal resin composition according to claim 2, wherein the boric acid (C) is orthoboric acid.

6. The polyacetal resin composition according to claim 2, further comprising 0.002 parts by mass or more and 10 parts by mass or less of a triazine derivative having a nitrogen-containing functional group.

7. The polyacetal resin composition according to claim 3, further comprising 0.002 parts by mass or more and 10 parts by mass or less of a triazine derivative having a nitrogen-containing functional group.

* * * * *

UNITED STATES PATENT AND TRADEMARK OFFICE
CERTIFICATE OF CORRECTION

| | |
|---|---|
| PATENT NO. | : 11,142,637 B2 |
| APPLICATION NO. | : 16/082052 |
| DATED | : October 12, 2021 |
| INVENTOR(S) | : Hatsuhiko Harashina and Hirokazu Katsuchi |

It is certified that error appears in the above-identified patent and that said Letters Patent is hereby corrected as shown below:

In the Specification

In Column 4, Line 65, delete "(≈-" and insert --(β- --.

In Column 7, Line 57, delete "vinyltrimetoxysilane," and insert --vinyltrimethoxysilane,--.

In Column 7, Lines 59-60, delete "γ-glycidoxypropyltrimetoxysilane," and insert --γ-glycidoxypropyltrimethoxysilane,--.

In Columns 9-10, Table 1, Line 9, delete "(B' 1)" and insert --(B'1)--.

In Columns 9-10, Table 1, Line 9, delete "(B' 1)" and insert --(B'1)--.

In Columns 9-10, Table 1, Line 12, delete "(C' )" and insert --(C')--.

In Columns 9-10, Table 1, Line 12, delete "(C' 1)" and insert --(C'1)--.

In Columns 9-10, Table 1, Line 13, delete "(C' 2)" and insert --(C'2)--.

In Columns 9-10, Table 1, Line 18, delete "(KPa)" and insert --(MPa)--.

In Columns 9-10, Table 2, Line 1, delete "Eample" and insert --Example--.

In Columns 9-10, Table 2, Line 9, delete "(B' 1)" and insert --(B'1)--.

In Columns 11-12, Table 2-continued, Line 1, delete "Eample" and insert --Example--.

In Columns 11-12, Table 2-continued, Line 3, delete "(C' )" and insert --(C')--.

In Columns 11-12, Table 2-continued, Line 3, delete "(C' 1)" and insert --(C'1)--.

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*

In Columns 11-12, Table 2-continued, Line 4, delete "(C' 2)" and insert --(C'2)--.

In Columns 11-12, Table 2-continued, Line 5, before "(D1)" insert --(D) Triazine derivative--.

In Column 11, Line 39, delete "copolymerized)" and insert --copolymerized).--.

In Column 11, Line 43, delete "copolymerized)" and insert --copolymerized).--.